US012572334B1

(12) United States Patent
Tanguay

(10) Patent No.: US 12,572,334 B1
(45) Date of Patent: *Mar. 10, 2026

(54) VISUAL DESIGN OF A RUNNING SOFTWARE APPLICATION

(71) Applicant: UNO Platform Inc., Montreal (CA)

(72) Inventor: Francois Tanguay, Montreal (CA)

(73) Assignee: UNO Platform Inc., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 19/270,389

(22) Filed: Jul. 15, 2025

Related U.S. Application Data

(63) Continuation of application No. 18/653,830, filed on May 2, 2024.

(51) Int. Cl.
    *G06F 8/34* (2018.01)
(52) U.S. Cl.
    CPC ...................................... *G06F 8/34* (2013.01)
(58) Field of Classification Search
    CPC ......................................................... G06F 8/34
    See application file for complete search history.

(56) References Cited

U.S. PATENT DOCUMENTS

| | | | |
|---|---|---|---|
| 5,416,890 A * | 5/1995 | Beretta ................. | H04N 1/6058 |
| | | | 345/590 |
| 11,243,867 B1 | 2/2022 | Wexler et al. | |
| 2005/0198610 A1* | 9/2005 | Fildebrandt ............... | G06F 8/38 |
| | | | 717/109 |
| 2008/0027682 A1 | 1/2008 | Herberger et al. | |

| | | | |
|---|---|---|---|
| 2008/0222618 A1 | 9/2008 | Valtchev | |
| 2009/0063204 A1 | 3/2009 | Stirlen et al. | |
| 2012/0137211 A1 | 5/2012 | Lewontin | |
| 2013/0332843 A1 | 12/2013 | Boettcher et al. | |
| 2014/0215507 A1 | 7/2014 | Wouhaybi et al. | |
| 2016/0098250 A1* | 4/2016 | Gross ................... | G06F 40/169 |
| | | | 717/109 |
| 2016/0360256 A1* | 12/2016 | Van Os ................. | A63F 13/215 |
| 2018/0210622 A1* | 7/2018 | Back ........................ | G06F 8/65 |
| 2019/0250891 A1 | 8/2019 | Kumar et al. | |

OTHER PUBLICATIONS

International Search Report & Written Opinion for the International Application No. PCT/IB2025/054628, mailed on Aug. 18, 2025, 8 pages.

* cited by examiner

*Primary Examiner* — Jae U Jeon
(74) *Attorney, Agent, or Firm* — Perkins Coie LLP

(57) ABSTRACT

A system provides a user interface comprising an application interface and a control interface. The application interface can include multiple interface elements and can be associated with a software application. The control interface can include multiple control elements configured to modify one or more properties of the multiple interface elements of the application interface. While running the software application, the system can receive an input causing a modification to the application interface. The modification can be associated with an existing interface element. In response to the input, the system can determine an instance of the existing interface element in the software application that is running. The system can modify the instance of the existing interface element in the software application that is running in accordance with the input so that executing code of the modified instance of the existing interface element causes the modification to the application interface.

19 Claims, 8 Drawing Sheets

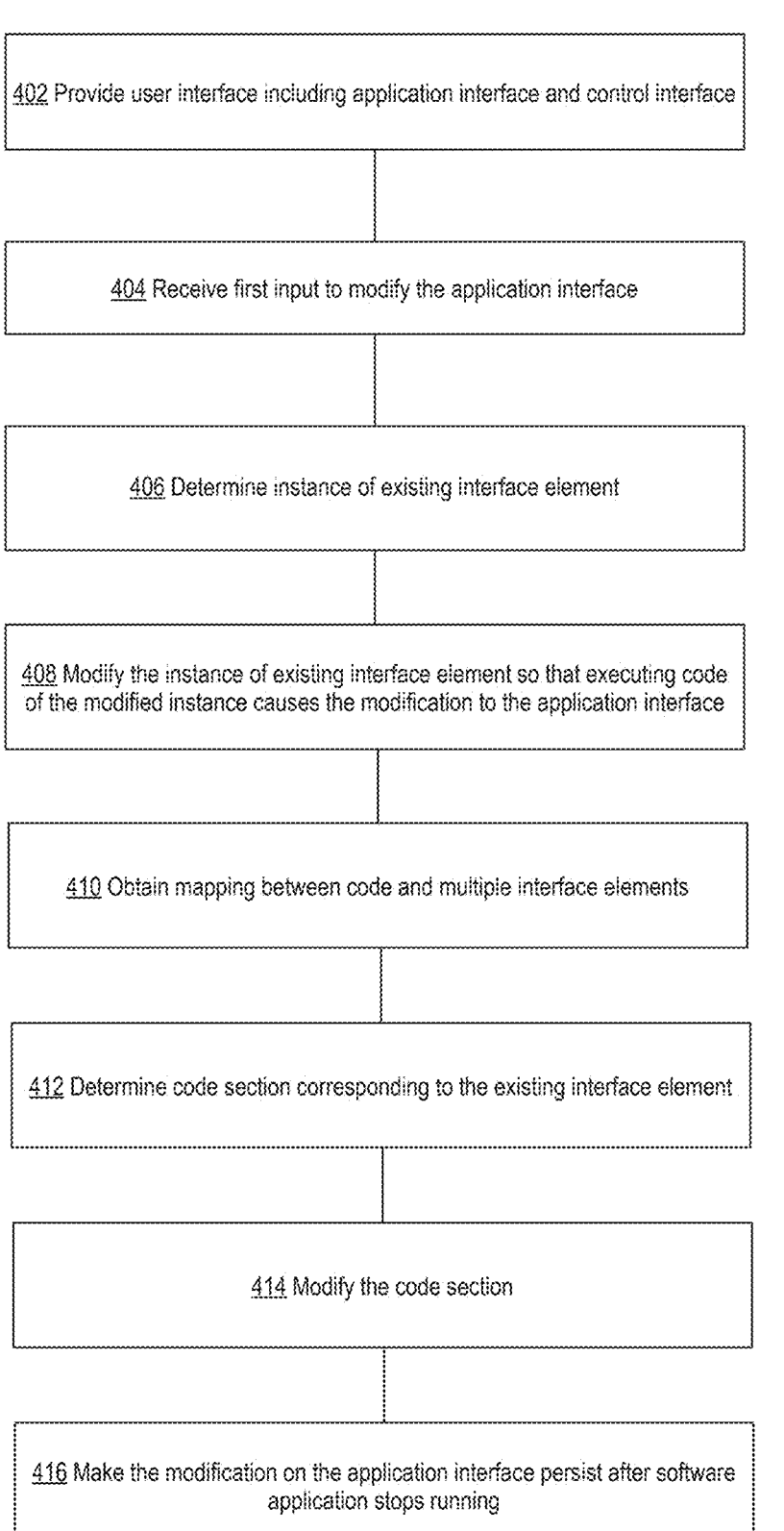

400

402 Provide user interface including application interface and control interface 404 Receive first input to modify the application interface 406 Determine instance of existing interface element 408 Modify the instance of existing interface element so that executing code of the modified instance causes the modification to the application interface 410 Obtain mapping between code and multiple interface elements 412 Determine code section corresponding to the existing interface element 414 Modify the code section 416 Make the modification on the application interface persist after software application stops running

*FIG. 4*

VISUAL DESIGN OF A RUNNING SOFTWARE APPLICATION

CROSS-REFERENCE TO RELATED APPLICATION

This application is a continuation of U.S. patent application Ser. No. 18/653,830, filed May 2, 2024, and titled VISUAL DESIGN OF A RUNNING SOFTWARE APPLICATION, which is incorporated herein by reference in its entirety.

BACKGROUND

Graphical user interfaces (GUIs, also called herein "user interfaces") provide for a visual manner for users to interact with electronic devices (e.g., desktop computers, laptops, mobile phones, or tablet computers). User interface elements are an important aspect of user interfaces. User interface elements include, for example, icons, buttons, windows, tabs, scroll bars, text fields, and menus that provide a cognitive and efficient manner for the users to operate electronic devices, search for and view data on the electronic devices, and organize and store data on the electronic devices. The design of a user interface has a significant role in making electronic devices accessible and user-friendly to a wide range of users. The efficient manner of operating electronic devices also plays a role in reduced battery consumption and, thereby, an improved user experience with electronic devices. Designing user interfaces is convention-ally involved with implementing the designed user inter-faces by coding using known programming languages.

BRIEF DESCRIPTION OF THE DRAWINGS

Detailed descriptions of implementations of the present invention will be described and explained through the use of the accompanying drawings.

FIG. 4 is a flow diagram illustrating processes for design-ing a running software application.

Figure 1:
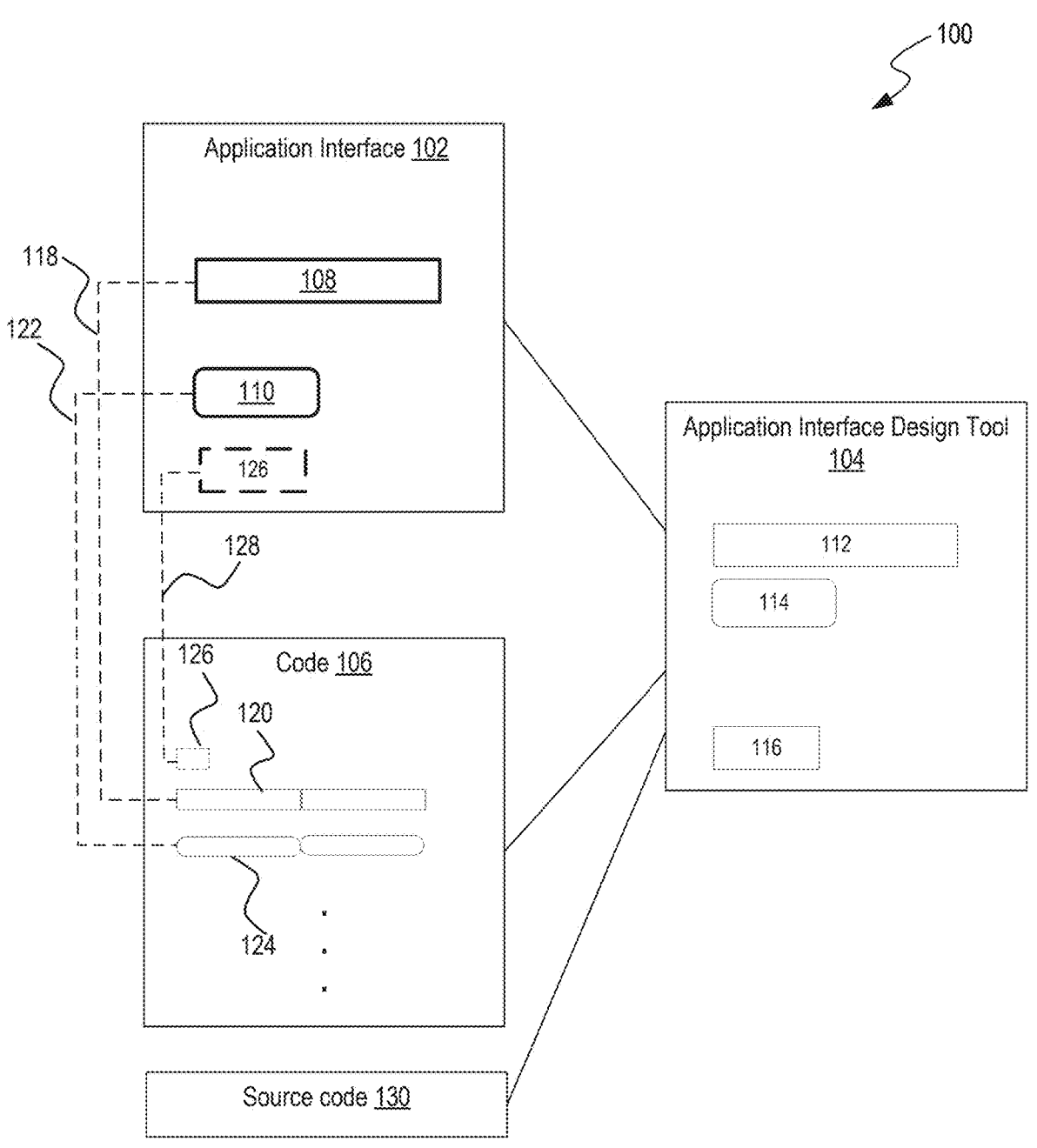
FIG. 1 is a block diagram of an example software system for designing application interfaces.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustra-tion, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology provides for easy, efficient, and user-friendly visual methods and systems for designing user interfaces for software applications. Specifically, the dis-closed system is directed to providing a way for a user to design a user interface using visual features while the software application is running. A running code associated with the application can be automatically modified in accor-dance with the user's design. The automatic modification can be done in real time while the software application is running (and the user is implementing modifications on the user interface of the software application). The real-time or near real-time automatic modification of the running code enables the user to view the modifications to the application interface as they actually look while the application is running. The change is real-time or near real time because the modification of the running code does not require a recompilation. Such a feature is especially beneficial when the application includes interface features that are continu-ously updated (e.g., streaming a video or retrieving continu-ous data).

The real-time automatic coding is facilitated by a running code associated with the software application. The running code can include multiple code sections associated with different features of the application interface (e.g., code for displaying user interface elements). When a user modifies a feature associated with an interface element, e.g., by adding, removing, or changing an interface element, on the appli-cation interface (e.g., the user changes a size, a color, or a location of the interface element), the disclosed system automatically modifies the code section relevant with that interface element. Simultaneously, modifications are being made to the source code of the software so that these modifications can be stored and become permanent after the software application is closed.

In one example, a system provides a user interface com-prising an application interface and a control interface. The application interface can include multiple interface ele-ments. The application interface can be associated with a software application. The control interface can include mul-tiple control elements configured to modify one or more properties of the multiple interface elements of the applica-tion interface. While running the software application, the system can receive a first input causing a modification to the application interface to add a new interface element to an existing interface element, to remove the existing interface element of the multiple interface elements, or to modify a property associated with the existing interface element of the multiple interface elements. In response to the first input, the system can determine an instance of the existing interface element in the software application that is running. The system can modify the instance of the existing interface element in the software application that is running in accor-dance with the first input so that executing code of the modified instance of the existing interface element causes the modification to the application interface. The system can obtain a mapping between a code and the multiple interface elements. The mapping can establish a correspondence between a code section in the code and an interface element among the multiple interface elements. Based on the first input and the mapping between the code and the multiple interface elements, the system can determine a code section corresponding to the existing interface element. The system can modify the code section corresponding to the existing interface element in accordance with the first input. The system can make the modification on the application inter-face persist after the software application stops running by storing the modified code section in a code database.

In another example, a method includes providing a user interface comprising an application interface and a control interface. The application interface can include multiple interface elements. The application interface can be associated with a software application. The control interface can include multiple control elements configured to modify one or more properties of the multiple interface elements of the application interface. While running the software application, the method can include receiving a first input causing a modification to the application interface. The modification can be associated with an existing interface element. In response to the first input, the method can include determining an instance of the existing interface element in the software application that is running. The method can include modifying the instance of the existing interface element in the software application that is running in accordance with the first input so that executing code of the modified instance of the existing interface element causes the modification to the application interface.

In yet another example, a system provides a user interface comprising an application interface and a control interface. The application interface can include multiple interface elements. The application interface can be associated with a software application. The control interface can include multiple control elements configured to modify one or more properties of the multiple interface elements of the application interface. While running the software application, the system can receive a first input causing a modification to the application interface. The modification can be associated with an existing interface element. In response to the first input, the system can determine an instance of the existing interface element in the software application that is running. The system can modify the instance of the existing interface element in the software application that is running in accordance with the first input so that executing code of the modified instance of the existing interface element causes the modification to the application interface.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Design of Running Software Applications

FIG. 1 is a block diagram of an example software system 100 for designing application interfaces (also referred to as "application user interfaces"). The system 100 includes a software application interface 102, an application interface design tool 104, and a running code 106 representing a software application that is running and executing in memory. In addition, the system 100 can include a source code 130 that corresponds to the running code 106. For example, the source code 130 can be compiled, interpreted, and/or parsed to obtain the running code 106. The system 100 can be implemented on a computer system 500 described with respect to FIG. 5. The reference to "code" in this application can refer to both the running code 106 and/or the source code 130.

The application interface 102 can be associated with a software application (e.g., a software application for a desktop computer, a laptop, a mobile phone, or a tablet computer). The application interface 102 can include interface elements (e.g., interface elements 108 and 110). An interface element can refer to a visual or interactive element displayed on the user interface. An interface element can be noninteractive or interactive. A noninteractive interface element can include a background, image objects, video objects, titles, text, etc., configured to be viewed by a user. An interactive interface element can allow a user to interact with the application (e.g., by providing a user input) to cause the application to perform certain functions. Exemplary active interface elements can include buttons, checkboxes, text fields, drop-down menus, sliders, and icons. The application interface 102 is associated with the source code 130. For example, the application interface 102 is displayed by executing the running code 106.

The application interface 102 can be modified (e.g., designed or redesigned) by the application interface design tool 104. The application interface design tool 104 can provide a visual way for a user to modify the application interface 102 in real-time or near real-time without requiring a recompilation of the source code 130. Specifically, the application interface design tool 104 enables the user to modify the running code 106 thus avoiding time-consuming recompilation, thus enabling a quick visualization of the user made changes.

The application interface design tool 104 can include control elements (e.g., the control elements 112 and 114) that allow a user (e.g., a software developer) to implement modifications to the application interface 102. A control element refers to a visual element that is associated with a particular action or interaction performed in response to receiving input on the control element. In some implementations, a control element is selectable so that a user can provide an input (e.g., a click input) to select to perform the action associated with the control element. In some implementations, a control element includes a text field that allows a user to input text inside the control element.

The modifications to the application interface 102 can include changing features associated with the interface elements of the application interface 102, adding new interface elements, or removing interface elements from the application interface 102. Some of the control elements on application interface design tool 104 can be associated with the interface elements on the application interface. For example, control element 112 is associated with the interface element 108, and the control element 114 is associated with interface element 110. A user can thereby modify the interface element 108 by an input on the control element 112 and the interface element 110 by an input on the control element 114. Modifying can include, for example, changing appearance (e.g., size, color, shape, font, symbol, or picture), relative location on the application interface, or functions associated with the interface element. The application interface design tool 104 can further include template interface elements (e.g., a template 116). The template 116 is a representation of an interface element that can be added to the application interface. The adding can be done, for example, by dragging and dropping the template 116 to the application interface 102, as will be described with respect to FIGS. 2A through 2C.

The source code 130 can include markup code, scripting code, or a compiled programming language. In some implementations, the source code 130 includes XAML (an HTML-like markup language) or C#(a language similar to Java or JavaScript). The source code 130 can also include HyperText Markup Language (HTML), Cascading Style Sheets (CSS), and/or JavaScript. The source code 130 can be compiled, interpreted, and/or parsed into the running code 106. The running code 106 includes code for displaying each of the interface elements on application interface 102. The running code 106 includes multiple code sections (e.g., code sections 120 and 124). Each of the sections can be associated with a feature of a respective interface element. Each of the code sections is also associated with a mapping (e.g., mappings 118 and 122) for a respective interface element. The mapping can be for a specific location on the code indicating where a certain code section (e.g., a code section for displaying a feature associated with an interface element) can be modified. The mapping can point to, for example, the beginning of an associated code section. As an example, the mapping 118 correlates the code section 120 with the interface element 108, and the mapping 122 correlates the code section 124 with the interface element 110. For example, the code section 120 is associated with the size of the interface element 108. When a user changes the size of the interface element 108 by an input on the control element 112, the system can automatically modify the code section 120 associated with the size of the interface element 108. The modification to the code section 120 is done, for example, by entering a modified code based on the mapping 118.

When a user add s a new interface element to the application interface 102, while the application associated with the application interface 102 is running, a new code section can be added automatically to the running code 106. For example, in response to the user adding an interface element corresponding to the template 116 on the application interface 102, a new code section 126 can be added. The new code section 126 can be added using a mapping 128 to the running code 106. The mapping 128 can be used for adding new interface elements on the application interface 102.

Modifying the running code 106 causes the modification to the displayed interface; however, the modification is not permanent. In addition to modifying the running code 106, the system 100 can modify the source code 130 and store the modification to make the modification permanent and available when source code 130 is compiled, interpreted, or parsed into a new instance of the running code 106.

Figure 2A:
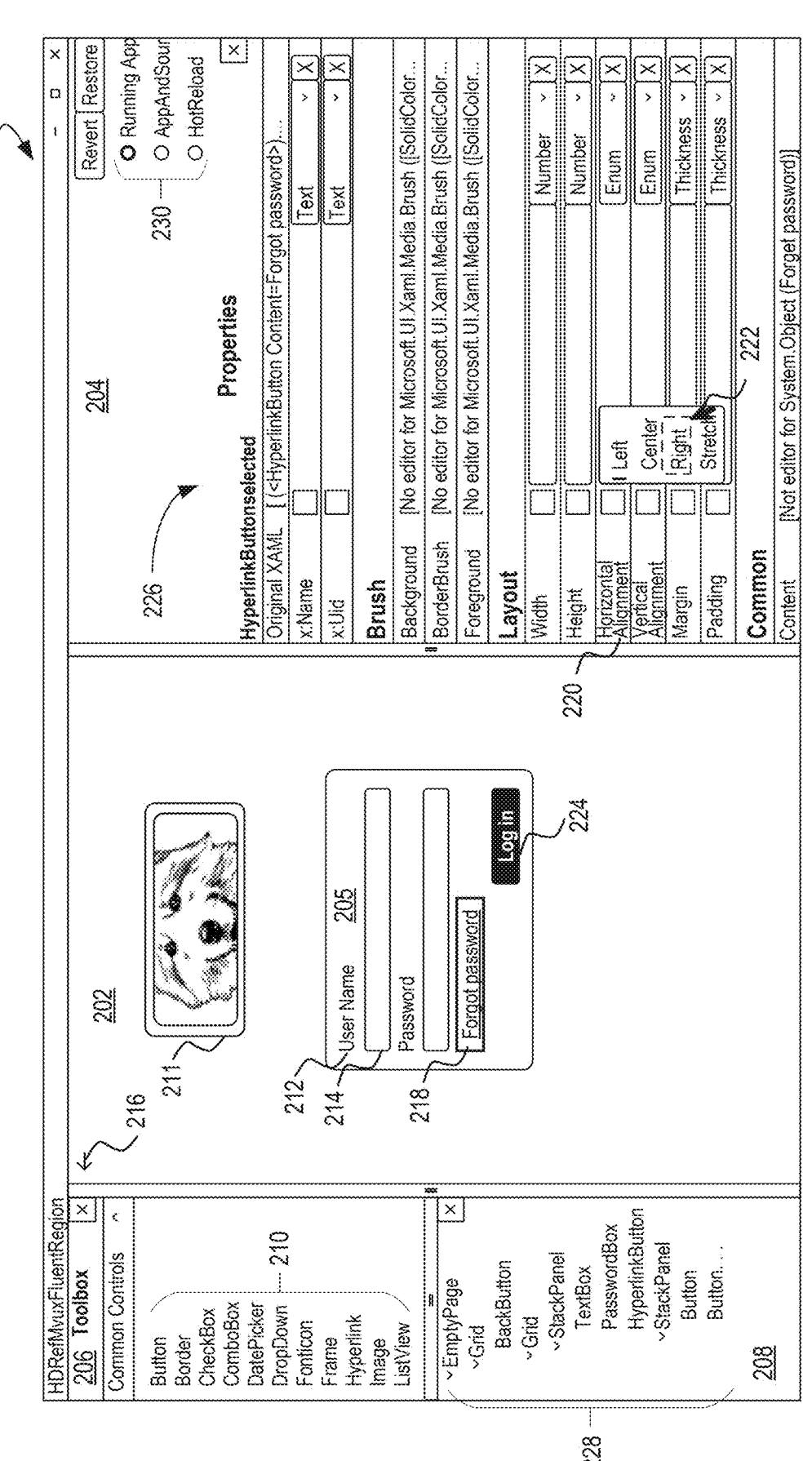
FIGS. 2A through 2C are exemplary views of a user interface for designing application interfaces.
Figure 2B:
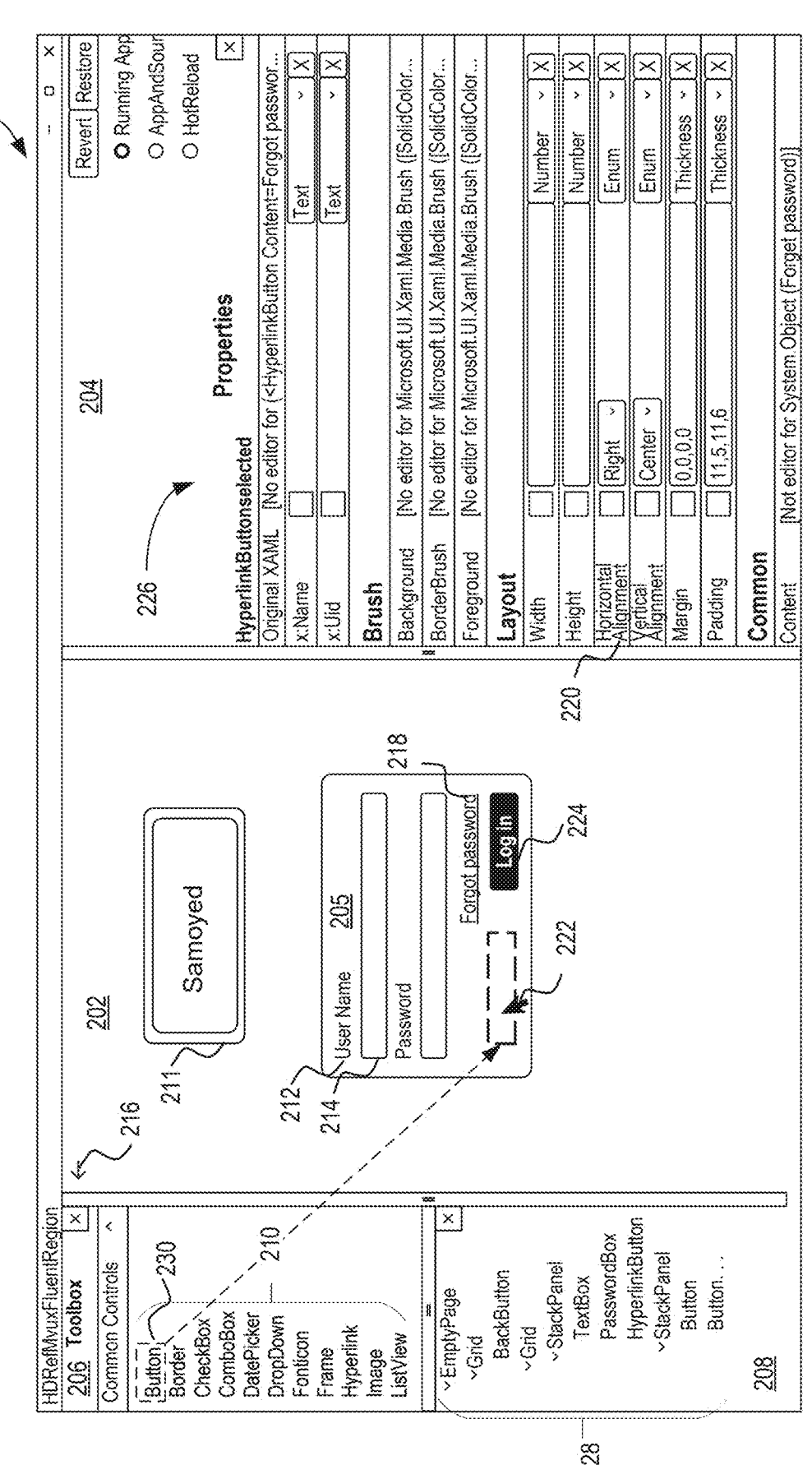
Figure 2C:
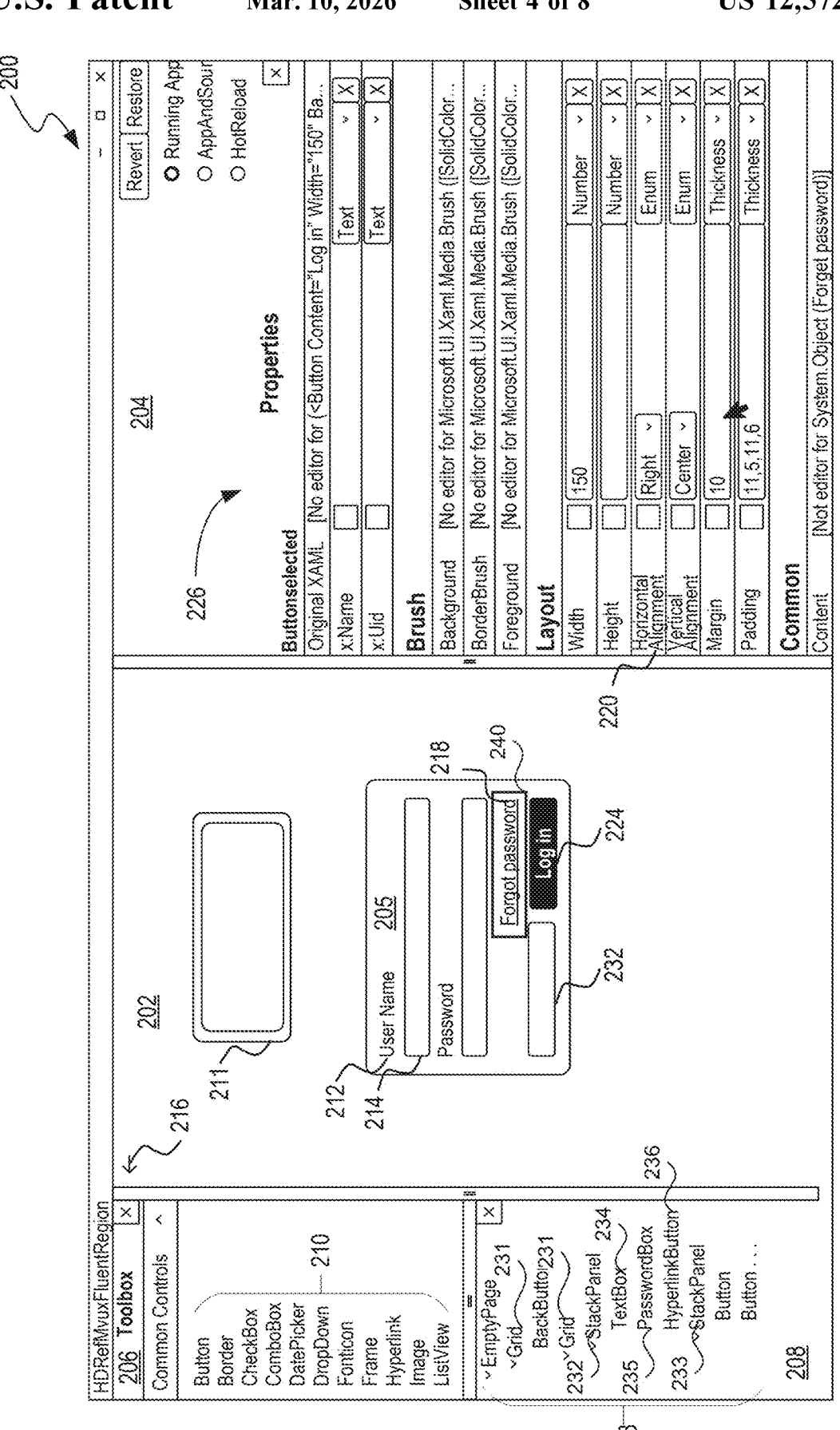

FIGS. 2A through 2C are exemplary views of a user interface 200 for designing application interfaces. The user interface 200 includes an application interface 202, a design tool section 206, a properties control section 204, and a hierarchical tree section 208. The application interface 202 is associated with a software application. The software application may be running while the user interface 200 is displayed. In some implementations, the application interface 202 corresponds to the application interface 102 described with respect to FIG. 1. The application interface 202 is associated with a code (e.g., the source code 130 and running code 106 described in FIG. 1).

The design tool section 206, properties control section 204, and hierarchical tree section 208 are all part of a control interface that can be associated with the application interface design tool 104 described with respect to FIG. 1. The control interface (e.g., an application control interface) can live in the context of the running application (e.g., decorates the running application). For example, the control interface further includes a transparent (non-visible) overlay over the application interface 202 (not shown in FIGS. 2A through 2C). Alternatively, the control interface can be implemented in a separate standalone context (e.g., not as an overlay) that communicates with the application interface through a communication channel. The control interface can be the application interface design tool 104 in FIG. 1. The control interface has access to the entire tree of object instances in the code associated with the application (e.g., as described with respect to FIGS. 3A-3B below). The control interface can apply changes to the running application (e.g., change the application interface and modify the associated code described in FIG. 3A-3B). Any modifications implemented on the application interface 202 using the control interface associated with the application interface design tool 104 are automatically and in real time applied to the running code 106. As shown, the application interface 202 can be positioned in the middle portion of the user interface 200 and in between the different sections of the control interface.

Figure 5:
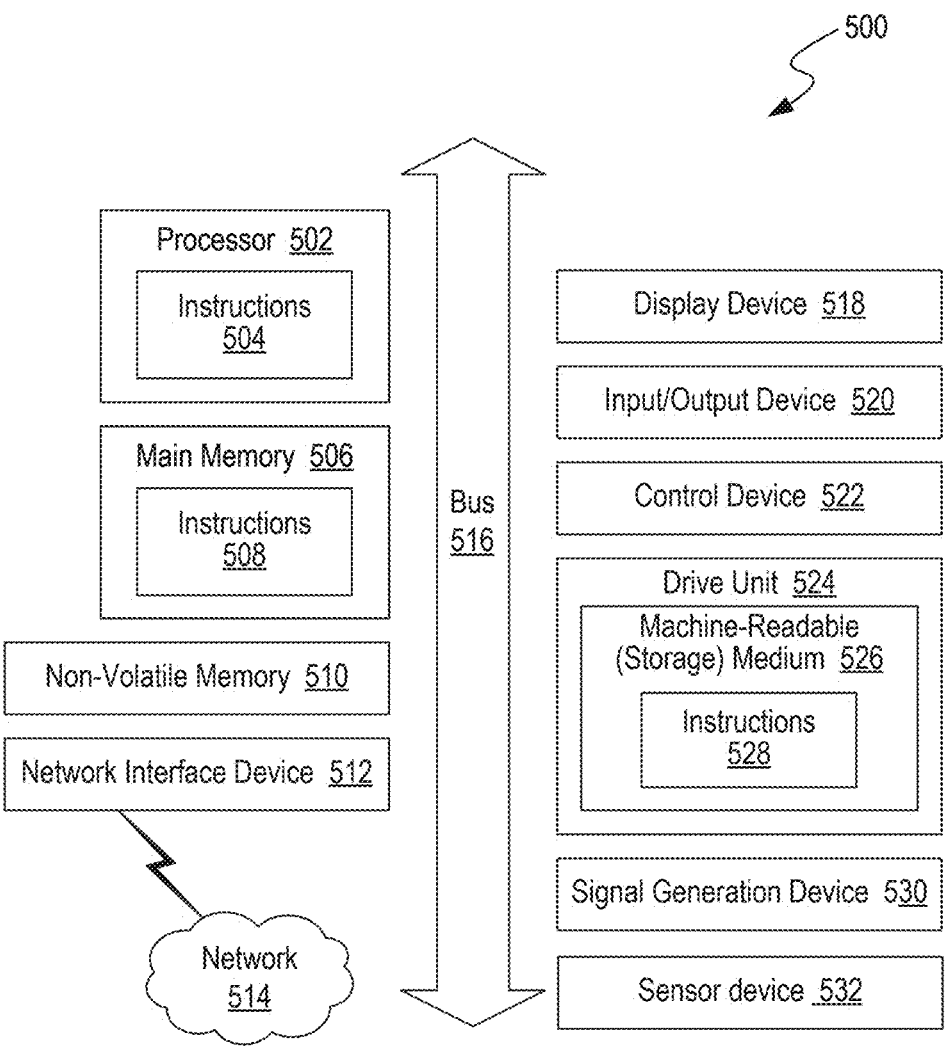
FIG. 5 is a block diagram that illustrates an example of a computer system in which at least some operations described herein can be implemented.

The application interface 202 is a GUI for a software application running on a computer device (e.g., the computer system 500 in FIG. 5). For example, the application is running when a processor of the computer system is continuously executing the code (e.g., the running code 106 in FIG. 1) associated with the application. The application interface 202 provides a manner for a user (e.g., a user designing the application interface) to interact with the application. In particular, the application interface 202 includes multiple interface elements, such as a back button 216, an active interface object 211 (e.g., a video object), a stack panel 205, a label 212 ("User Name"), a text box 214, a selectable element 218 ("Forgot password"), and a selectable element 224 ("Log in").

The interface elements are configured for providing a user with information and guidance for interacting with the application interface 202. The application interface design tool 104 can include control, e.g., control element 112, 114 in FIG. 1. For example, control element 112 can be associated with the interface element 218. A user can thereby modify the interface element 218 by an input on the control element 112.

The user can provide a user input (also referred to as an "input") to the control elements to interact with the application interface 202. An input can include, for example, a click, a drag, a tap, a double-click, or a combination thereof provided via a user input device or a control device (e.g., an input/output device 520 or a control device 522 in FIG. 5) when a cursor (e.g., a cursor 222 in FIG. 2A) or a caret is positioned on the interface element. As an example, the application interface 202 is configured for requesting the user to provide a user name (e.g., the label 212 and the text box 214) and a password in order to log in (e.g., by an input on the selectable element 224) to a user account associated with the associated application. The back button 216 can allow the user to view a previously presented window or a user interface associated with the same application. The active interface object 211 can provide video content that is streamed while a user is interacting with the user interface 200.

The properties control section 204 includes a table 226 (or a list) of control elements or sub-elements for modifying the application interface 202 properties. Specifically, the table 226 in the properties control section 204 can display control elements for modifying features associated with an interface element that has been activated on the application interface 202. For example, as shown in FIG. 2A, the selectable element 218 has been activated by a user input. The activation can be done in response to an input on the transparent overlay of the application interface design tool 104 at a location corresponding to the control element 112. The activation can be indicated with display of a bounding box 240 or a highlight on the transparent overlay of the control interface at the location of the interface element 218. For example, a user has provided a user input such as a click when the cursor 222 is positioned over the selectable element 218. In response to the activation of the control element 112, the properties control section 204 displays the table 226 that includes additional control elements for modifying features of the interface element 218. For example, the table 226 identifies the activated interface element by an indication "HyperlinkButton selected." The layout section of the table 226 includes control elements (e.g., the control element 220 with a drop-down menu) for modifying the size (e.g., "Width" and "Height" control elements), position on the application interface 202 (e.g., "Horizontal Alignment" and "Vertical Alignment"), properties for a margin, and properties for a padding. The table 226 also includes a brush section for modifying colors for the appearance of the application interface 202.

The design tool section 206 includes multiple templates 210 representing interface elements that the user could add to the application interface. The templates 210 can be included as a list of names identifying a type of template, as shown. The templates 210 can also be included as a list of symbols or icons (i.e., the templates 210 can include a symbol for a button, a border, a checkbox, etc.). In some implementations, a user can add an interface element to the application interface 202 by a user input. For example, a user can drag and drop a template from the design tool section 206 to a location on the application interface 202 to add an interface element corresponding to that template to the drop location on the application interface 202.

The hierarchical tree section 208 includes a hierarchy tree providing a visualization of relative hierarchical relationships between the interface elements on the application interface 202. The hierarchical tree section 208 includes representations 228 (e.g., a text or a symbol) that correspond to the interface elements of the application interface 202 arranged in accordance with their relative relationships. The hierarchical tree section 208 can provide an easy and convenient manner for the user to review the relationships. The hierarchical tree section 208 can be updated automatically in response to any changes in the hierarchical relationships between the interface elements on the application interface. In some implementations, a user can change the hierarchical relationships of the interface elements by providing an input on the hierarchical tree section 208 (e.g., by dragging and dropping a representation to change its position on the tree). Any modifications to the relative location of the representations 228 on the hierarchical tree can be updated to the code (e.g., the source code 130 and the running code 106 in FIG. 1) associated with the application interface 202.

As an example, for modifications implemented on the application interface 202 using the properties control section 204, in FIG. 2A, a user has activated the control element 112, and while the control element 112 is activated, the user is providing a selective input (e.g., via a cursor 222) on the control sub-element 220 on the properties control section 204 associated with horizontal alignment (location) of the interface element 218. The user can change a value associated with the interface element 218 via the control element 220. The control element 220 can be control sub-element 220. Specifically, the user is selecting the alignment of the interface element 218 to be "Right" to move the interface element 218 to a position on the right side of the stack panel 205. In FIG. 2B, in response to the input, the interface element 218 is moved to be positioned on the right side of the stack panel 205.

As another example, in FIG. 2B, the user has provided an input (e.g., a drag and drop) to add a template 230 ("Button") from the design tool section 206 to a location on the stack panel 205 on the application interface 202. In response to the input, an interface element 242 is added to the stack panel 205.

The modifications to the application interface 202, as described through the examples illustrated in FIGS. 2A through 2C, can be performed while the application associated with the application interface 202 is running. For example, as shown throughout FIGS. 2A through 2C, the active interface object 211 can provide continuously streamed video content while the modifications to the application interface 202 are being implemented.

Figure 3A:
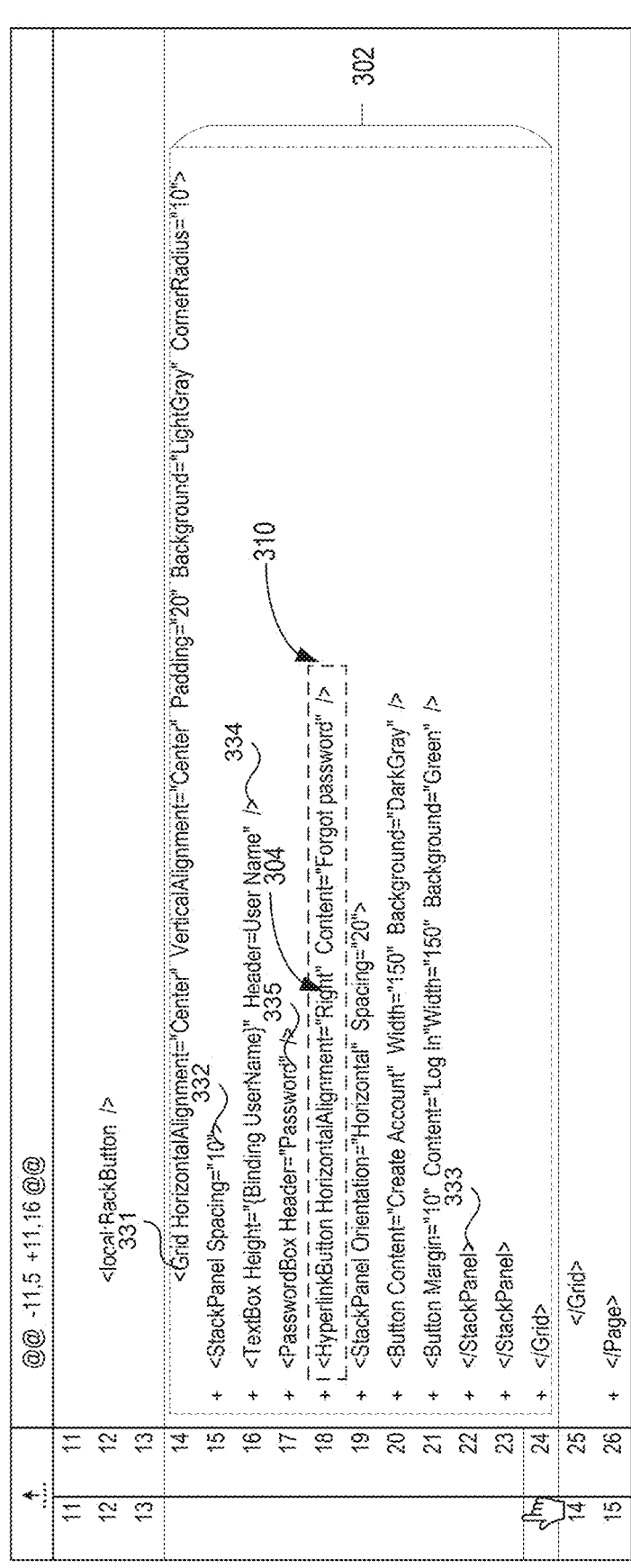
FIG. 3A is an exemplary illustration of a user interface for providing code associated with an application interface.

FIG. 3A is an exemplary illustration of a modified source code 302 associated with an application interface 202 of FIGS. 2A through 2C. The source code 302 can be the source code 130 in FIG. 1. In some implementations, the source code 302 is associated with the source running code 106 described with respect to FIG. 1. The source code 302 can include markup code, scripting code, or compiled programming code. The source code 302 includes code for displaying each of the interface elements on application interface 202.

The source code 302 can include multiple code sections (e.g., a code section 310). Each of the code sections can be associated with (mapped to) an interface element on application interface 202. For example, the code section 310 is associated with interface element 218 in FIGS. 2A through 2C. Each of the code sections can further include values associated with features of a respective interface element. For example, the code section 310 includes a value 304 that is associated with the alignment (position) of interface element 218, as described with respect to FIGS. 2A through 2C. As shown, the value 304 in the code section 310 has been updated to include that the horizontal alignment of the interface element 218 is "Right" in response to the input and the modification performed on the application interface 202 in FIGS. 2A and 2C.

Each of the code sections in the source code 302 can be associated with a mapping that specifies a correspondence between the source code and the modified feature of the running code 106. Such mapping can correspond to any of the mappings 118, 122, and 128 described with respect to FIG. 1. If the user modifies the application interface, the system stores the modified code section 310 (e.g., the modified value 304).

The modified source code 130 can be stored in a code database after the application is closed (e.g., the application stops running). The code database can include a source code file stored in memory or a database based on the use of a database management system such as an structured query language (SQL) database. The source code file can be managed by a version control system. This way, the modification to the application interface persists after the application stops running so that next time the running of the application is initiated, the modified application can be presented to the user.

Figure 3B:
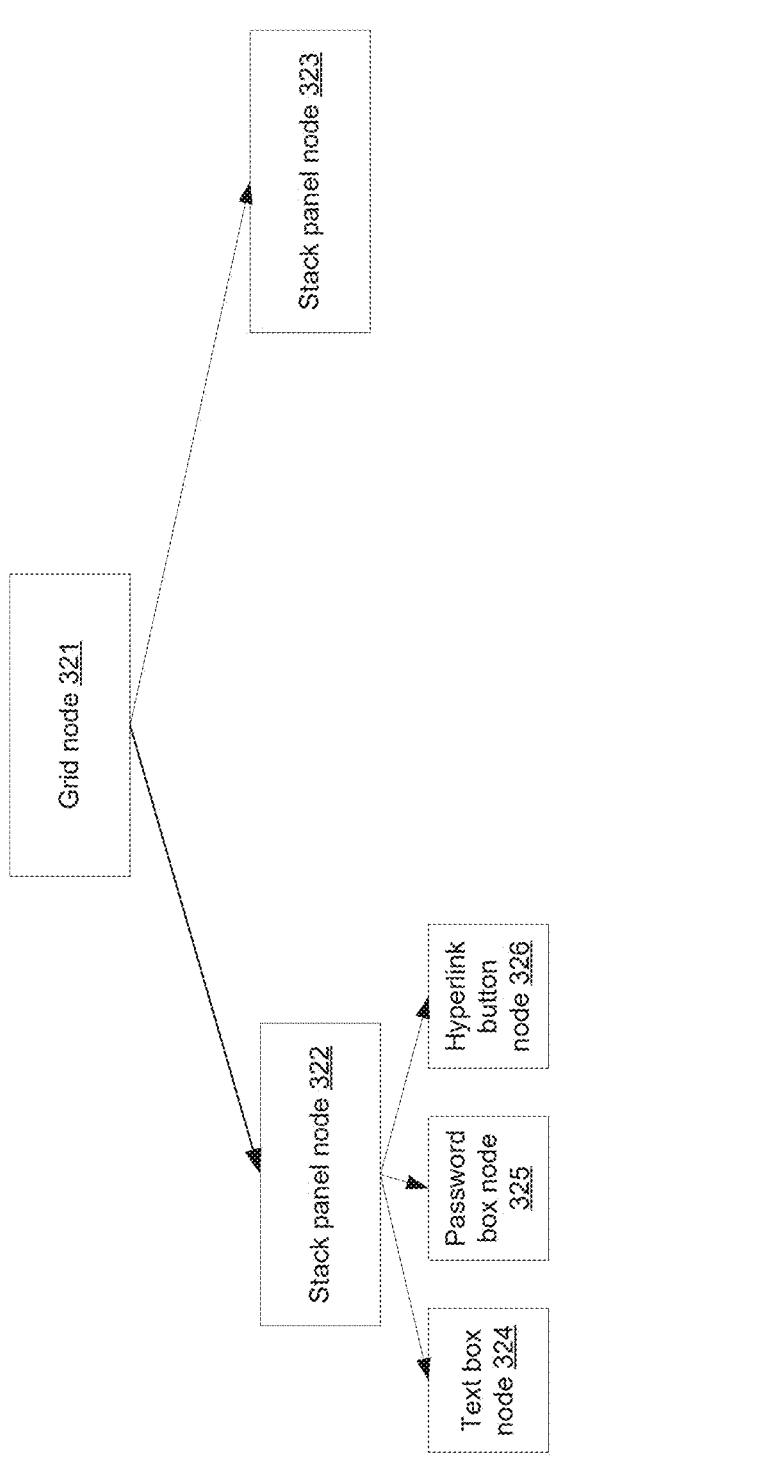
FIG. 3B is an exemplary illustration of a modified running code.

FIG. 3B is an exemplary illustration of a modified running code. The running code 106 in FIG. 1 can include a tree of object instances 320 that is loaded in runtime memory of a computer and represented in machine-executable binary code. The tree of object instances 320 can include instances of objects corresponding to the source code 302 in FIG. 3A.

Each node 321-326 can represent a running code section of the software application that is running in memory. For example, the node 321 can correspond to the grid 231 in FIG. 2C, the node 322 can correspond to the stack panel 232 in FIG. 2C, the node 323 can correspond to the stack panel 233 in FIG. 2C, the node 324 can correspond to the text box 234 in FIG. 2C, the node 325 can correspond to the password box 235 in FIG. 2C, and the node 326 can correspond to the hyperlink button 236.

Additionally, each node 321-326 can correspond to a section of source code 302 in FIG. 3A. For example, the grid 231, stack panel 232, 233, text box 234, password box 235, and hyperlink button 236 can respectively correspond to the grid code section 331 in FIG. 3A, stack panel code section 332, 333 in FIG. 3A, text box code section 334 in FIG. 3A, password box code section 335 in FIG. 3A, and hyperlink code section 310 in FIG. 3A.

When a user clicks somewhere in the overlay, the system can walk the tree of object instances 320 to find the element at that position, e.g., element 326, namely the hyperlink button. The system can display a bounding box 240 in FIG. 2C on the overlay over the interface element 218 in FIG. 2C corresponding to the element 326. The system can display the list of properties of interface elements in the properties control section 204 in FIGS. 2A-2C.

When the user changes a value in properties of interface element 218, such as a value of the control element 220 in FIGS. 2B-2C, the system can apply those changes to the element 326, which represents an instance of the interface element 218 in the running code 106. By modifying the running code 106, the system can create a visualization of the change in real-time or near real-time because no recompilation of the source code is necessary.

FIG. 4 is a flow diagram illustrating processes 400 for designing a running software application. The processes 400 can be performed by a system (e.g., the computer system 500 described with respect to FIG. 5). The processes 400 can include displaying a user interface such as the user interface 200 described with respect to FIGS. 2A through 2C. The associated source code can include the source code described with respect to FIG. 3A. The user interface is configured for implementing modifications to an existing application interface while running the application associated with the application interface.

At 402, the system can provide a user interface including an application interface and a control interface. For example, in FIGS. 2A through 2C, the user interface 200 includes the application interface 202 and the control interface includes the design tool section 206, the properties control section 204, and the hierarchical tree section 208. The application interface includes interface elements. For example, the application interface 202 includes multiple interface elements, such as the back button 216, the active interface object 211, the stack panel 205, the label 212 ("User Name"), the text box 214, the interface element 218 ("Forgot password"), and the interface element 224 ("Log in").

The application interface can be associated with a software application that is running on the system. The application interface can be provided by executing a code including multiple code sections (e.g., the source code 302 including the code section 310 in FIG. 3A associated with the application interface 202 in FIGS. 2A through 2C). Each of the multiple code sections can be associated with a feature of the application interface. Each of the multiple code sections can be associated with a mapping. For example, the source code 302 can correspond to the source code 130 including code sections 120 and 124 with respective mappings 118 and 122 in FIG. 1.

In some implementations, providing the control interface includes providing a first portion (e.g., the design tool section 206) and a second portion (e.g., properties control section 204) of the control interface. The first portion can include multiple templates (e.g., the templates 210) of interface elements configured to be added as interface elements to the application interface. The second portion can include multiple control elements configured to modify properties of the interface elements on the application interface. For example, the properties control section 204 in FIGS. 2A through 2C includes the table 226, which includes control elements for modifying features of the application interface 202. The application interface can be positioned between the first portion and the second portion of the control interface (e.g., the application interface 202 is positioned between the properties control section 204 and the design tool section 206).

At 404, while running the software application, the system can receive a first input (e.g., via the cursor 222 in FIGS. 2A and 2B). The first input can cause a modification on the application interface. The modification can be to add a new interface element, to remove an existing interface element of the multiple interface elements, or to modify a property associated with the existing interface element of the interface elements (e.g., as described with respect to FIGS. 2A and 2B). The property can include a size, a color, a location, a symbol, a text, or a function of the existing interface element.

At 406, in response to the first input, the system can determine an instance of the existing interface element in the software application that is running. In some implementations, determining the instance of the existing interface element in the software application includes obtaining a tree of object instances existing in memory associated with the software application that is running. For example, the system can obtain the running code 106 in FIG. 1, which includes a tree of object instances 320 in FIG. 3B from a memory. The tree of object instances 320 can represent multiple running code sections (e.g., the code section 326). A code section among the multiple code sections can correspond to the existing interface element among the multiple interface elements. For example, the code section 326 can correspond (e.g., be mapped to) the interface element 218 described with respect to FIGS. 2A through 2C. Subsequent to receiving the first input indicating the existing interface element to modify, the system can traverse the tree of object instances to obtain an object instance corresponding to the existing interface element.

At 408, the system can modify the instance of the existing interface element in the software application that is running in accordance with the first input so that executing code of the modified instance of the existing interface element causes the modification to the application interface. For example, in FIG. 2A, the user clicks on the transparent overlay of the control interface at a location corresponding to the interface element 218 to activate the control element 112 (e.g., the overlay displays a bounding box 240 in FIG. 2C over the interface element 218 in FIG. 2A). The user then provides a user input to change the location of the interface element 218 in the control element 220 in the control section 204. In response, the corresponding value in the code section 326 in FIG. 3B is automatically updated to include the changed value (e.g., "Right"). Simultaneously, the location of the interface element 218 is changed to align on the right side of the stack panel 205.

At 410, the system can obtain a mapping between a code and the multiple interface elements. The mapping can establish a correspondence between a source code section in the source code and an interface element (e.g., the interface elements 108 and 110) among the multiple interface elements.

In some implementations, obtaining the mapping between the code and the multiple interface elements includes automatically determining the mapping establishing the correspondence between the code section in the code and the multiple interface elements among the multiple interface elements. In some implementations, the mapping can be determined using artificial intelligence (AI) or a fuzzy logic system. For example, the AI or fuzzy logic system interprets the code sections and the interface elements and creates correlations between the code sections and the interface elements based on the interpretation. An AI system can include an AI model configured to interpret software code, such as a large language model (LLM), natural language processing (NLP), Generative Pre-trained Transformer (GPT), CodeBERT, a syntax tree model, and/or a Transformer-XL. A fuzzy logic system can include a system based on fuzzy sets, fuzzy logic operators, fuzzy inferences, and/or fuzzy logic.

In some implementations, the mapping between the code and the multiple interface elements is based on metadata associated with the software application. The metadata can include indications that correlate the multiple interface elements to the code. In some implementations, the mapping between the code and the multiple interface elements is based on tags implemented in the code. A tag implemented in the code can be configured to correlate to a particular interface of the multiple interface elements.

At 412, the system can determine a code section corresponding to the existing interface element based on the first input and the mapping between the code and the multiple interface elements. For example, in FIG. 2A, the user provides an input on the interface element 218 that corresponds to the interface element 108 in FIG. 1. Based on the input and the mapping 118, the system determines that the code section corresponding to the interface element 218 is the code section 120. At 414, the system can modify the code section corresponding to the existing interface element in accordance with the first input. For example, the system modifies the code section 120 similar to what is shown in FIGS. 3A-3B with respect to the code section 310, 326 of the code 302, 320.

At 416, the system can make the modification on the application interface persist after the software application stops running by storing the modified code section in a code database. For example, after the user closes the software application and the software application stops running, the modified code section 120 will be stored in a database. Next time the user opens the software application, the application interface includes the modification so that the interface element 218 is positioned on the right side of the stack panel 205, as shown in FIG. 2B.

In some implementations, the first input causes a modification of the property associated with the existing interface element. The property can include a size, a color, a location, a symbol, a text, or a function of the existing interface element. The system can identify an object instance of an additional code section in the code in the software application that is running (e.g., the running code 106 in FIG. 1 includes multiple code sections). The additional code section can correspond to the property associated with the existing interface element. The system can replace the identified code section associated with the property with a new code section associated with the modified property of the existing interface element in the software application that is running.

In some implementations, the system receives an input causing a modification to a property associated with the application interface (and not to an existing interface element). Such modification can include, for example, resizing the application interface or modifying operations associated with input gestures associated with the application interface.

For example, the modification can include making the application interface smaller or larger. As another example, the modification can include changing an input gesture required for closing the application interface (e.g., from a double-click input gesture to a click-and-hold input gesture).

In some implementations, the system provides the user interface comprising the application interface and the control interface. The control interface comprises multiple templates (e.g., the templates 210 in FIGS. 2A through 2C) of multiple interface elements. The system can receive the first input corresponding to a gesture (e.g., a drag-and-drop gesture) to move a template corresponding to the new interface element from the control interface to the application interface (e.g., as shown in FIGS. 2B and 2C). The system can modify the application interface to include the new interface element at a location indicated by the first input. The new interface element is added to the existing interface element. The system can modify the code by adding a new code section to the code at an object instance corresponding to the existing interface element.

In some implementations, the first input causes a modification of the property associated with the existing interface element (e.g., as described with respect to FIGS. 2A and 2B). The property can include a size, a color, a location, a symbol, a text, or a function of the existing interface element. The system can be caused to identify a code section of the multiple code sections associated with the property based on an associated mapping. The system is also caused to replace the identified code section associated with the property with a new code section associated with the modified property of the existing interface element.

In some implementations, prior to receiving the first input, the system receives a second input on a transparent overlay of the control interface in a location corresponding to the existing interface element of the interface elements to activate the existing interface element (e.g., in FIG. 2A, the interface element 218 is shown as activated). In response to receiving the first input, the system can modify a property (e.g., the control sub-element 220 for horizontal alignment of the interface element 218) associated with the first interface element on the application interface. The system can also modify the code. Modifying the code can include replacing an existing code section of the multiple code sections associated with the property associated with the first interface element with a new code section associated with the modified property of the first interface element.

In some implementations, while running the software application, the system receives a manual modification to a code section of the object instance (e.g., the source code 302 in FIG. 3A). The code section can be associated with a feature of the application interface. The system can cause an additional modification on the application interface in accordance with the manual modification to the code section. For example, a user can provide a modification on the source code 302 in FIG. 3A, which will automatically, and in real time, be implemented on the application interface 202 in FIGS. 2A through 2C.

In some implementations, running the software application includes continuously executing the code by the processor of the system. Modifying the application interface and modifying the associated object instance can be performed in response to the first input while the application is running.

In some implementations, the system retrieves data from a data source while the software application is running. The data source can include a data source associated with the system or a data source that is separate from the system and in communication with the system. In some implementations, the data is retrieved from a cloud source or from the internet. The system can continuously populate an interface element on the application interface with the data (e.g., the active interface object 211 in FIGS. 2A through 2C). The first input causing the modification to the application interface can be received while populating the data on the application interface. For example, the active interface object 211 can include a table, a chart, an image object (e.g., a video image object), or any other visualization for data that can be populated based on the retrieved data. The data can include images, videos, social media feeds, financial information, news media information, weather information, server information (e.g., server data associated with the application), or any other data.

In some implementations, retrieving the data includes retrieving streaming data from the data source while the software application is running. The streaming data can include data that is generated in real time or near real time. The first input causing the modification to the application interface can be received while providing the streaming data on the application interface.

In some implementations, retrieving the data includes retrieving sensor data. The system can be a mobile device (e.g., a smartphone) that can receive sensor data from one or more sensors of the mobile device while the application is running. The sensor data can include, for example, accelerometer data, gyroscope data, magnetometer data, global positioning system (GPS) data, proximity data, ambient light data, environmental data (e.g., temperature or humidity), health data (e.g., heart rate or blood pressure), and/or identification data (e.g., fingerprint or facial recognition data). The mobile device can continuously populate an interface element on the application interface with the sensor data. The first input causing the modification to the application interface can be received while populating the sensor data on the application interface. In some implementations, the sensor data is retrieved from one or more sensor devices or systems that are separate from the system for designing the application interface. For example, the one or more sensor devices are part of an Internet of Things (IoT).

In some implementations, the system further provides a hierarchical tree of the interface elements on the application interface on the control interface. The hierarchical tree illustrates a structural relationship between the interface elements on the application interface. For example, the hierarchical tree section 208 in FIGS. 2A through 2C includes the representations 228 (e.g., a text or a symbol) that correspond to the interface elements of the application interface 202 arranged in accordance with their relative relationships.

Computer System

FIG. 5 is a block diagram that illustrates an example of a computer system 500 in which at least some operations described herein can be implemented. As shown, the computer system 500 can include one or more processors 502, main memory 506, non-volatile memory 510, a network interface device 512, a display device 518, an input/output device 520, a control device 522 (e.g., keyboard and pointing device), a drive unit 524 that includes a machine-readable (storage) medium 526, a signal generation device 530, and one or more sensor devices 532 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the Figures and any other components described in this specification can be implemented.

The computer system 500 can take any suitable physical form. For example, the computer system 500 can share a similar architecture as that of a server computer, personal computer (PC), tablet computer, mobile telephone, game console, music player, wearable electronic device, network-connected ("smart") device (e.g., a television or home assistant device), augmented reality/virtual reality (AR/VR) systems (e.g., head-mounted display), or any electronic device capable of executing a set of instructions that specify action(s) to be taken by the computer system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, near real time, or in batch mode.

The network interface device 512 enables the computer system 500 to mediate data in a network 514 with an entity that is external to the computer system 500 through any communication protocol supported by the computer system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computer system 500. The machine-readable (storage) medium 526 can be non-transitory or comprise a non-transitory device. In this context, a non-transitory storage medium can include a device that is tangible, meaning that the device has a concrete physical form, although the device can change its physical state. Thus, for example, "non-transitory" refers to a device remaining tangible despite this change in state.

The one or more sensor devices 532 can include, for example, an accelerometer, a gyroscope, a magnetometer, a GPS locator, a proximity sensor, an ambient light sensor, one or more environmental sensors (e.g., a temperature or humidity sensor), a health parameter sensor (e.g., heart rate or blood pressure sensor), an image sensor, and/or depth sensors (e.g., for collecting fingerprint or facial recognition data).

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computer system 500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation, and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art or profession, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A system for providing a graphical user interface for real time visual modifications to a running software application, the system comprising:
   a display;
   at least one hardware processor; and
   at least one non-transitory memory storing instructions, which, when executed by the at least one hardware processor, cause the system to:
   present, on the display of the system, the graphical user interface comprising an application interface and a control interface both of which are presented simultaneously,
      wherein the application interface shows output of executing machine-executable code of the software application while the software application is running, wherein the application interface comprises multiple interface elements, wherein a first portion of the control interface comprises multiple control elements configured to modify one or more properties of the multiple interface elements of the application interface, and wherein a second portion of the control interface includes a transparent overlay provided over the application interface;

while running the software application, receive a first input on the transparent overlay causing a visual modification to the application interface, wherein the visual modification adds a new interface element to an existing interface element of the multiple interface elements, removes the existing interface element of the multiple interface elements, or modifies a property associated with the existing interface element of the multiple interface elements;

wherein the first input causes the visual modification to a property associated with the existing interface element, wherein the property includes a size, a color, a location, a symbol, a text, or a function of the existing interface element:

while running the software application, in response to the first input, modify machine-executable code of an instance of the existing interface element in the software application in accordance with the first input, wherein modifying the machine-executable code includes:

identifying, in the software application that is running, a section of the machine-executable code of the instance of the existing interface element corresponding to the property associated with existing interface element;

replacing, in the software application that is running, the identified section of the machine-executable code associated with the property with a new running code section associated with the modified property of the existing interface element; and without recompiling, execute the modified machine-executable code of the modified instance of the existing interface element, thereby causing the modification to the application interface in real time.

2. The system of claim 1, comprising instructions that cause the system to:

while the software application is running, retrieve streaming data from a data source; and present the streaming data as a video interface element embedded on the application interface, wherein the first input causing the modification to the application interface is received while presenting the streaming data on the application interface.

3. The system of claim 2, wherein the video interface element is the existing interface element, wherein the visual modification to the existing interface element modifies the property associated with the video interface element, and wherein the system comprises instructions that cause the system to, simultaneously with causing the video interface element to be modified, continuously updating the video interface element according to the presented streaming data.

4. The system of claim 1, comprising instructions that cause the system to:

while the software application is running, retrieve data from a data source; and continuously populate an interface element on the application interface with the data, wherein the first input causing the modification to the application interface is received while populating the data on the application interface, and wherein the modification to the application interface is performed while populating the data on the application interface.

5. The system of claim 1, wherein the system is a mobile device, and the mobile device comprise instructions that cause the mobile device to:

receive sensor data from one or more sensors of the mobile device while the software application is running; and continuously populate an interface element on the application interface with the sensor data, wherein the first input causing the modification to the application interface is received while populating the sensor data on the application interface.

6. The system of claim 1, comprising instructions that cause the system to:

determine the instance of the existing interface element in the software application, wherein the instructions to determine the instance of the existing interface element comprise instructions to:

obtain a tree of object instances existing in memory associated with the software application that is running, wherein the tree of object instances represents multiple machine-executable code sections, wherein a machine-executable code section among the multiple machine-executable code sections corresponds to the existing interface element among the multiple interface elements; and responsive to receiving the first input indicating the existing interface element to be modified, traverse the tree of object instances to obtain an object instance corresponding to the existing interface element.

7. The system of claim 1, comprising instructions that cause the system to:

obtain a mapping between the machine-executable code and the multiple interface elements, wherein the mapping establishes a correspondence between a machine-executable code section in the machine-executable code and an interface element among the multiple interface elements, and wherein the instructions to obtain the mapping between the software application that is running and the multiple interface elements comprise instructions to automatically determine the mapping establishing the correspondence between a machine-executable code section in the software application that is running and the multiple interface elements among the multiple interface elements using artificial intelligence or a fuzzy logic system.

8. The system of claim 7, comprising instructions that cause the system to:

based on the first input and the mapping between the machine-executable code and the multiple interface elements, determine a machine-executable code section corresponding to the existing interface element;

modify the machine-executable code section corresponding to the existing interface element in accordance with the first input; and make the modification on the application interface persist after the software application stops running by storing the modified machine-executable code section in a code database.

9. The system of claim 1, wherein the control interface comprises multiple templates of interface elements, and the system comprises instructions that cause the system to:

receive the first input corresponding to a gesture to instantiate a template corresponding to a new interface element from the control interface to the application interface;

modify the application interface to include the new interface element at a location indicated by the first input, wherein the new interface element is added to the existing interface element; and modify the software application that is running by adding a new machine-executable code section to the software application that is running at an object instance corresponding to the existing interface element.

10. The system of claim 1, comprising instructions that cause the system to:

while running the software application, receive a manual modification to a machine-executable code section of the software application that is running, the machine-executable code section associated with a feature of the application interface; and cause an additional modification on the application interface in accordance with the manual modification to the machine-executable code section.

11. A non-transitory, computer-readable storage medium comprising instructions recorded thereon, wherein the instructions, when executed by at least one data processor of a system, cause the system to:

present, on a display of the system, a graphical user interface comprising an application interface and a control interface both of which are presented simultaneously, wherein the application interface shows output of executing machine-executable code of a software application while the software application is running, wherein the application interface comprises multiple interface elements, and wherein a first portion of the control interface comprises multiple control elements configured to modify one or more properties of the multiple interface elements of the application interface; and while running the software application, receive a first input on the graphical user interface causing a visual modification to the application interface, wherein the visual modification adds a new interface element to an existing interface element of the multiple interface elements, removes the existing interface element of the multiple interface elements, or modifies a property associated with the existing interface element of the multiple interface elements, wherein the first input causes the visual modification to a property associated with the existing interface element, wherein the property includes a size, a color, a location, a symbol, a text, or a function of the existing interface element;

while running the software application, in response to the first input, modify machine-executable code of an instance of the existing interface element in the software application in accordance with the first input, wherein modifying the machine-executable code includes:

identifying, in the software application that is running, a section of the machine-executable code of the instance of the existing interface element corresponding to the property associated with existing interface element;

replacing, in the software application that is running, the identified section of the machine-executable code associated with the property with a new running code section associated with the modified property of the existing interface element; and without recompiling, execute the modified machine-executable code of the modified instance of the existing interface element, thereby causing the modification to the application interface in real time.

12. The non-transitory, computer-readable storage medium of claim 11, comprising instructions to:

while the software application is running, retrieve streaming data from a data source; and present the streaming data as a video interface element embedded on the application interface, wherein the first input causing the modification to the application interface is received while presenting the streaming data on the application interface.

13. The non-transitory, computer-readable storage medium of claim 11, comprising instructions to:

while the software application is running, retrieve data from a data source; and continuously populate the existing interface element on the application interface with the data, wherein the first input causing the modification to the application interface is received while populating the data on the application interface, and wherein the modification to the application interface is performed while populating the data on the application interface.

14. The non-transitory, computer-readable storage medium of claim 11, wherein the system is a mobile device, and non-transitory, computer-readable storage medium comprise instructions to:

receive sensor data from one or more sensors of the mobile device while the software application is running; and continuously populate an interface element on the application interface with the sensor data, wherein the first input causing the modification to the application interface is received while populating the sensor data on the application interface.

15. The non-transitory, computer-readable storage medium of claim 11, comprising instructions to:

determine the instance of the existing interface element in the software application, wherein the instructions to determine the instance of the existing interface element comprise instructions to:

obtain a tree of object instances existing in memory associated with the software application that is running, wherein the tree of object instances represents multiple machine-executable code sections, wherein a machine-executable code section among the multiple machine-executable code sections corresponds to the existing interface element among the multiple interface elements; and responsive to receiving the first input indicating the existing interface element to be modified, traverse the tree of object instances to obtain an object instance corresponding to the existing interface element.

16. The non-transitory, computer-readable storage medium of claim 11, comprising instructions to:

obtain a mapping between the machine-executable code and the multiple interface elements, wherein the mapping establishes a correspondence between a machine-executable code section in the machine-executable code and an interface element among the multiple interface elements, and wherein the instructions to obtain the mapping between the software application that is running and the multiple interface elements comprise instructions to automatically determine the mapping establishing the correspondence between a machine-executable code section in the software application that is running and the multiple interface elements among the multiple interface elements using artificial intelligence or a fuzzy logic system.

17. A method performed by a system for providing a graphical user interface for real time visual modifications to a running software application, the method comprising:

presenting, on a display of the system, the graphical user interface comprising an application interface and a control interface both of which are presented simultaneously, wherein the application interface shows output of executing machine-executable code of the software application while the software application is running, wherein the application interface comprises multiple interface elements, and wherein a first portion of the control interface comprises multiple control elements configured to modify one or more properties of the multiple interface elements of the application interface; and while running the software application, receiving a firstinputon the graphical user interface causing a visual modification to the application interface, wherein the visual modification adds a new interface element to an existing interface element of the multiple interface elements, removes the existing interface element of the multiple interface elements, or modifies a property associated with the existing interface element of the multiple interface elements, wherein the first input causes the visual modification to a property associated with the existing interface element, wherein the property includes a size, a color, a location, a symbol, a text, or a function of the existing interface element;

while running the software application, in response to the first input, modifying machine-executable code of an instance of the existing interface element in the software application in accordance with the first input, wherein modifying the machine-executable code includes:

identifying, in the software application that is running, a section of the machine-executable code of the instance of the existing interface element corresponding to the property associated with existing interface element;

replacing, in the software application that is running, the identified section of the machine-executable code associated with the property with a new running code section associated with the modified property of the existing interface element; and without recompiling, executing the modified machine-executable code of the modified instance of the existing interface element, thereby causing the modification to the application interface in real time.

18. The method of claim 17, comprising:

while the software application is running, retrieving streaming data from a data source; and presenting the streaming data as a video interface element embedded on the application interface, wherein the first input causing the modification to the application interface is received while presenting the streaming data on the application interface.

19. The method of claim 17, comprising:

while the software application is running, retrieving data from a data source; and continuously populating the existing interface element on the application interface with the data, wherein the first input causing the modification to the application interface is received while populating the data on the application interface, and wherein the modification to the application interface is performed while populating the data on the application interface.

* * * * *